(12) United States Patent
Roffe et al.

(10) Patent No.: US 12,203,502 B2
(45) Date of Patent: Jan. 21, 2025

(54) BEARING HOUSING ASSEMBLY AND RING CONFIGURED TO PROVIDE MULTIPLE MODES OF OPERATION

(71) Applicant: Schaeffler Technologies AG & Co. KG, Herzogenaurach (DE)

(72) Inventors: Dennis Roffe, Fort Mill, SC (US); James Brown, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 156 days.

(21) Appl. No.: 18/079,131

(22) Filed: Dec. 12, 2022

(65) Prior Publication Data

US 2024/0191747 A1 Jun. 13, 2024

(51) Int. Cl.
*F16C 23/06* (2006.01)
*F16C 35/067* (2006.01)
*F16C 43/04* (2006.01)

(52) U.S. Cl.
CPC ............ *F16C 23/06* (2013.01); *F16C 35/067* (2013.01); *F16C 43/04* (2013.01)

(58) Field of Classification Search
CPC ...... F16C 23/06; F16C 35/042; F16C 35/047; F16C 35/06; F16C 35/062; F16C 35/067; F16C 43/04

See application file for complete search history.

(56) References Cited

U.S. PATENT DOCUMENTS 7,661,928 B2 * 2/2010 Bart ...................... F01D 25/162
415/232

FOREIGN PATENT DOCUMENTS

| DE | 102017125550 A1 * | 5/2019 | |
| FR | 710524 A * | 1/1931 | |
| WO | WO-2019030244 A2 * | 2/2019 | ......... B60B 27/0073 |

\* cited by examiner

*Primary Examiner* — James Pilkington
(74) *Attorney, Agent, or Firm* — Volpe Koenig

(57) ABSTRACT

An improved configuration for a bearing housing assembly is disclosed herein in which a ring can be configured to be secured in at least two positions such that the bearing assembly positioned inside of the housing can be retained in either a fixed state or a floating state. The ring can be configured to be secured at least partially within the housing in at least a first configuration and a second configuration, such that: (i) the ring is configured to abut the bearing assembly in the first configuration such that the bearing assembly is axially fixed relative to the housing, and (ii) the ring is configured to be spaced apart from the bearing assembly in the second configuration such that the bearing assembly is axially displaceable within the housing.

16 Claims, 5 Drawing Sheets

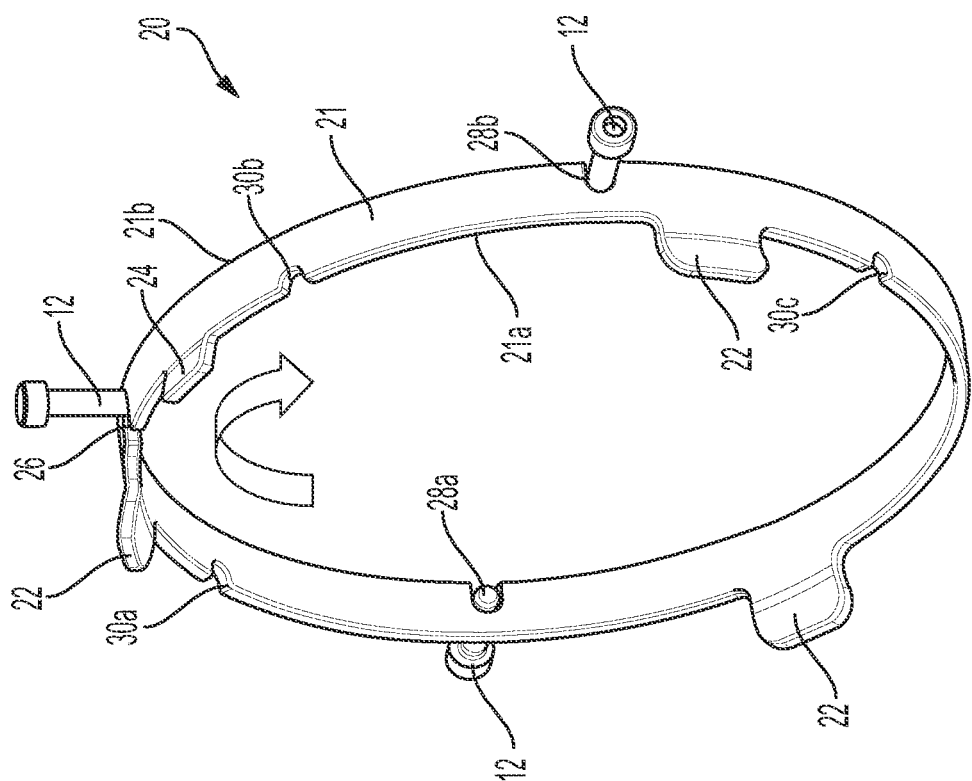
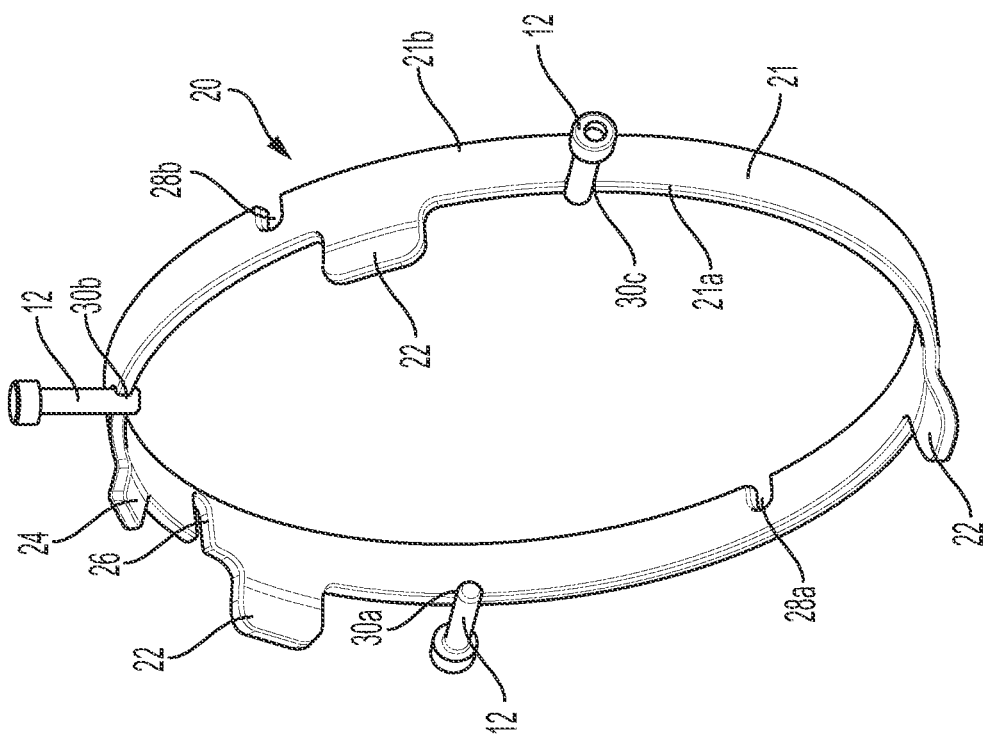

BEARING HOUSING ASSEMBLY AND RING CONFIGURED TO PROVIDE MULTIPLE MODES OF OPERATION

FIELD OF INVENTION

The present disclosure relates to a bearing housing assembly, and more particularly relates to a ring for providing various modes of operation for the bearing housing assembly.

BACKGROUND

Bearing housing assemblies are well known and typically include a bearing assembly arranged inside of a housing. It is desirable to allow for the bearing assembly to be in a fixed position or a floating position, depending on the specific requirements for an assembly. One known method or configuration for allowing multiple configurations of the bearing assembly includes using multiple, internal retaining rings or an internal retaining ring on one side of the housing and a step on the other side. These known arrangements make it difficult to access, remove, or install internal retaining rings within the housing, particularly if specific tools are not readily accessible.

It would be desirable to provide an improved configuration in which a user can more easily and readily access the relevant components to provide various modes of operation for the bearing housing assembly.

SUMMARY

An improved configuration for a bearing housing assembly is disclosed herein. The bearing housing assembly can include a housing, a bearing assembly positioned within the housing, and a ring configured to be secured at least partially within the housing in at least a first configuration and a second configuration, such that: (i) the ring is configured to abut the bearing assembly in the first configuration such that the bearing assembly is axially fixed relative to the housing (i.e. a locked or fixed bearing assembly mode), and (ii) the ring is configured to be spaced apart from the bearing assembly in the second configuration such that the bearing assembly is axially displaceable within the housing (i.e. a floating bearing assembly mode). The ring can also be referred to as a locking ring or fixing ring.

At least one fastening element can be configured to secure the ring relative to the housing. The fastening element can be configured to extend radially inward through the housing and through the ring such that the ring is fixed relative to the housing.

The ring can include at least one locking receiving area configured to receive the at least one fastening element in the first configuration, and at least one floating receiving area configured to receive the at least one fastening element in the second configuration.

The locking receiving area can comprise three locking slots each defined on a first axial side of a body of the ring.

The at least one floating receiving area can include three floating slots, wherein a first floating slot of the three floating slots is defined on the first axial side of the body of the ring, and a second floating slot and a third floating slot are defined on a second axial side of the body of the floating ring. The first floating slot of the three floating slots can have a greater depth than a depth of the second floating slot and the third floating slot of the three floating slots.

The ring can comprise a body including at least one tab configured to be engaged by a user, and at least one alignment indicator configured to align with at least one of a first indicator defined on the housing or a second indicator defined on the housing based on the relative positioning of the ring and the housing. The indicators can provide visual signals to a user regarding which mode the assembly is positioned in.

The housing can include at least one opening configured to receive at least one fastening element to secure the ring relative to the housing.

In another embodiment, a ring can be provided that is configured to be secured relative to a bearing housing assembly including a housing and a bearing assembly.

A method of adjusting a configuration of a bearing housing assembly is also disclosed herein. The method can include: arranging a bearing assembly inside of a housing; inserting a ring at least partially within the housing in a least one first configuration or in at least one second configuration; and securing the ring relative to the housing via at least one fastening element such that: (i) in the first configuration, the ring is arranged in a first position relative to the bearing assembly and the ring is configured to abut the bearing assembly (i.e. a fixed bearing assembly mode); or (ii) in the second configuration, the ring is arranged in a second position relative to the bearing assembly and the ring is configured to be spaced apart from the bearing assembly (i.e. a floating bearing assembly mode).

The at least one fastening element can be inserted from a radial direction to extend through the housing and the ring. The ring can include a body including at least one tab configured to be engaged by a user.

The ring can include at least one alignment indicator configured to align with at least one of a first indicator defined on the housing or a second indicator defined on the housing based on the relative positioning of the ring and the housing.

The ring can include at least one locking receiving area configured to receive the at least one fastening element in the first configuration, and at least one floating receiving area configured to receive the at least one fastening element in the second configuration.

Engagement of the at least one fastening element can be accessible to a user from an exterior of the housing.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 4A is a perspective view of the ring and a plurality of fastening elements in a first configuration.

FIG. 4B is a perspective view of the ring and the plurality of fastening elements in a second configuration.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1:
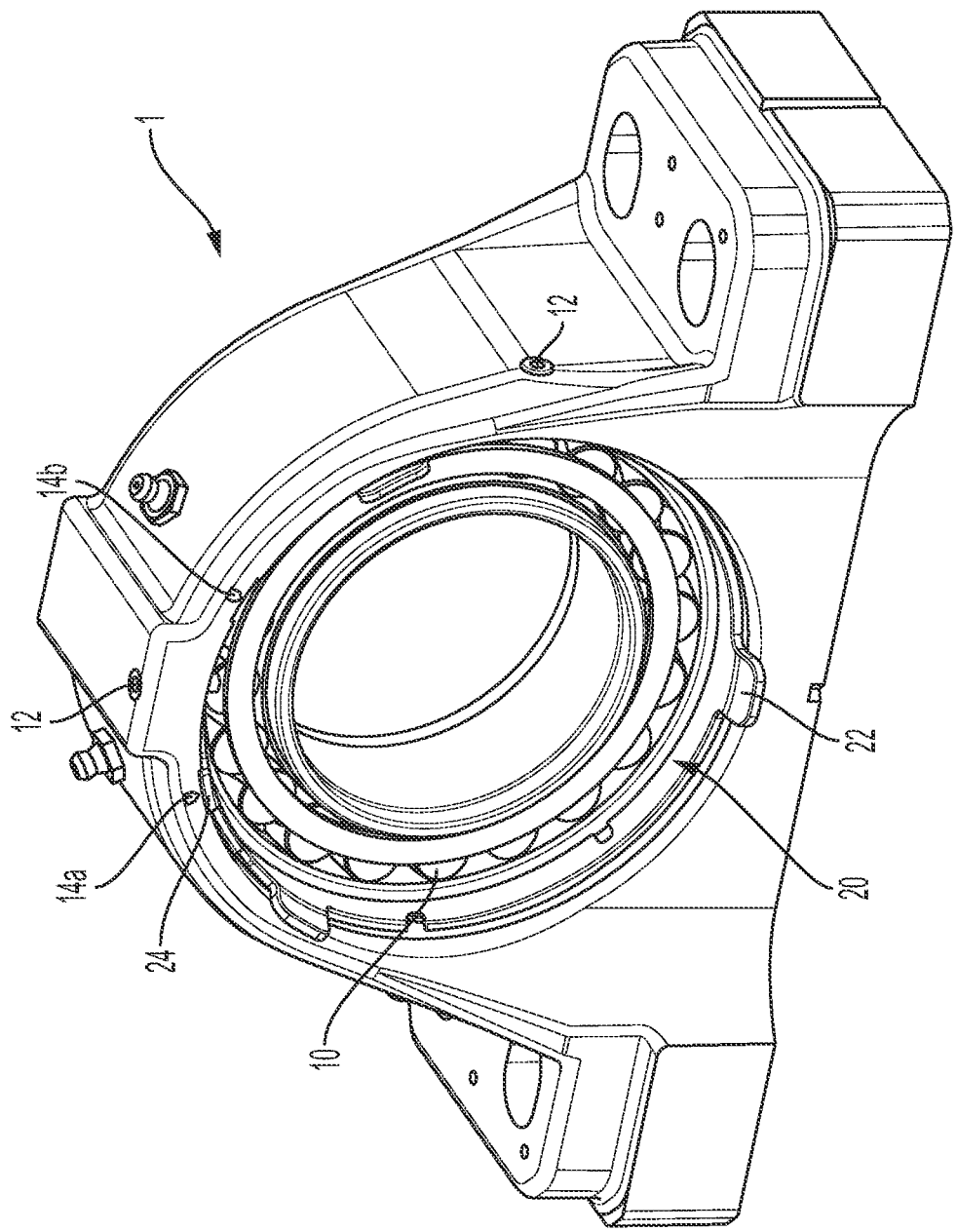
FIG. 1 is a perspective view of a bearing housing assembly according to one aspect.
Figure 2:
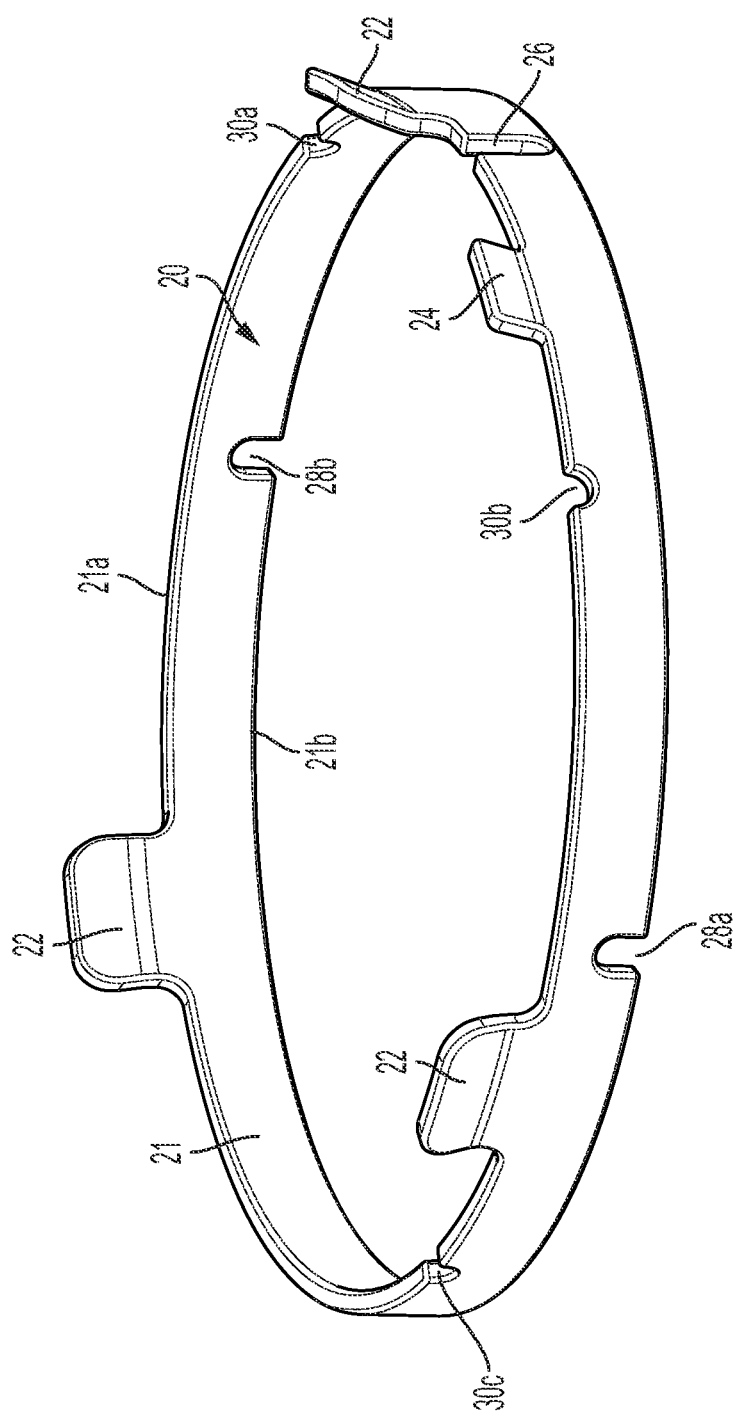
FIG. 2 is a perspective view of a ring for the bearing housing assembly of FIG. 1.
Figure 5A:
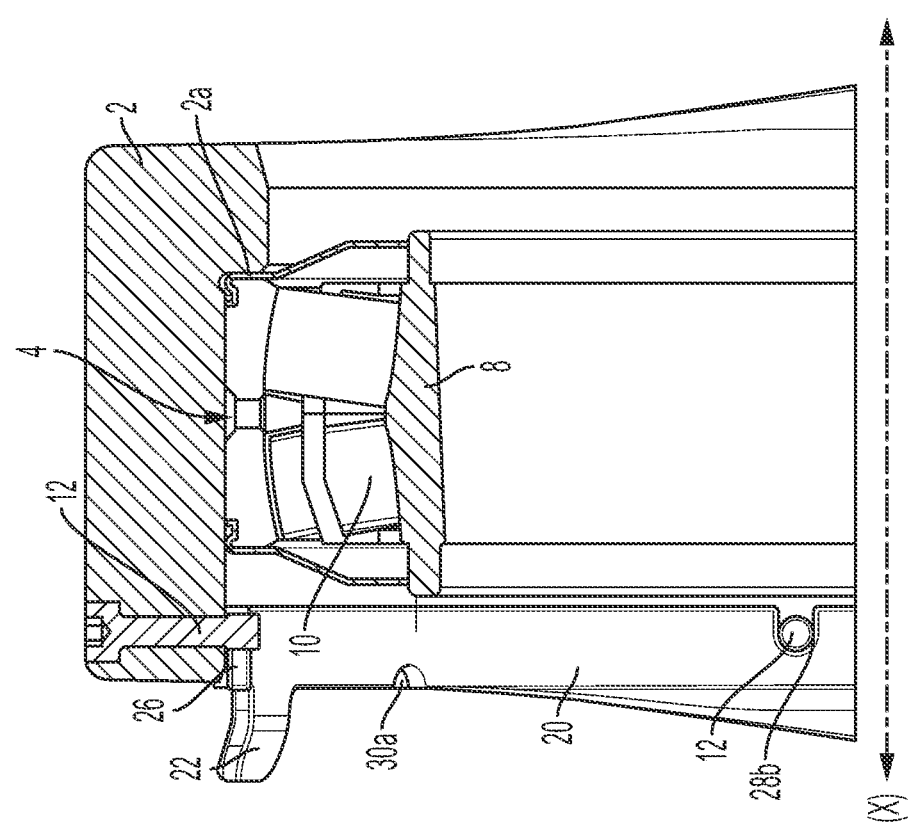
FIG. 5A is a cross-sectional view of the bearing housing assembly in a first configuration.
Figure 5B:
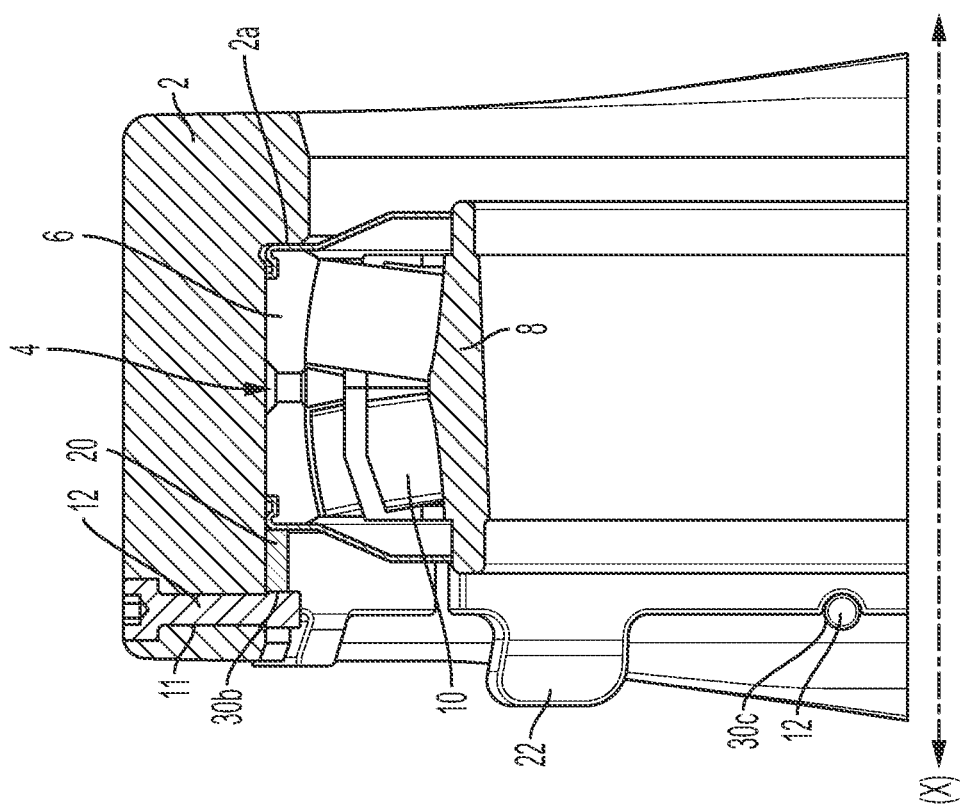
FIG. 5B is a cross-sectional view of the bearing housing assembly in a second configuration.

As shown in FIGS. 1, 5A, and 5B, a bearing housing assembly 1 is disclosed herein that includes a housing 2, a bearing assembly 4 positioned within the housing 2, and a ring 20 configured to be secured at least partially within the housing 2 in at least a first configuration and a second configuration. The first configuration can correspond to a fixed mode of the bearing assembly 4 relative to the housing 2. The second configuration can correspond to a floating mode of the bearing assembly 4 relative to the housing 2. The bearing assembly 4 can include a double row, tapered rolling bearing, including an inner ring defining the inner raceways, an outer ring defining the outer raceways, and at least one cage. The exact configuration of the bearing assembly 4 can vary depending on the specific requirements for a particular application.

The ring 20 can be configured to abut the bearing assembly 4 in the first configuration such that the bearing assembly 4 is axially fixed relative to the housing 2 (i.e. a locked or fixed mode). This configuration is shown in FIG. 5A. As shown in FIG. 5A, a first axial side (i.e. left side) of the bearing assembly 4 abuts the ring 20, and a second axial side (i.e. right side) of the bearing assembly 4 abuts a shoulder 2a formed on the housing 2.

The ring 20 can be configured to be spaced apart from the bearing assembly 4 in the second configuration such that the bearing assembly 4 is axially displaceable within the housing 2 (i.e. a floating mode). This configuration is shown in FIG. 5B. As shown in FIG. 5B, the bearing assembly 4 is free to move in an axial direction between the shoulder 2a of the housing 2 and the ring 20.

At least one fastening element 12 can be configured to secure the ring 20 relative to the housing 2. The at least one fastening element 12 can include at least three screws. The screws can include heads that are accessible from an exterior of the housing 2 when in in the installed position. The fastening element 12 can be configured to extend radially inward through the housing 2 and through the ring 20. The housing 2 can comprise at least one opening 11 configured to receive at least one fastening element 12 to secure the ring 20 relative to the housing 2. The at least one opening 11 can include three openings, in one example.

The ring 20 can include at least one locking receiving area 30a-30c configured to receive the at least one fastening element 12 in the first configuration, and at least one floating receiving area 26, 28a, 28b configured to receive the at least one fastening element 12 in the second configuration. The term receiving area can be used herein to refer to a hole, slot, opening, receptacle, or other structure configured to allow passage of the fastening element 12 through the ring 20.

The at least one locking receiving area 30a-30c can comprise three locking slots 30a-30c that are each defined on a first axial side 21a of a body 21 of the ring 20.

The at least one floating receiving area 26, 28a, 28b can include three floating slots 26, 28a, 28b. A first floating slot 26 of the three floating slots can be defined on the first axial side 21a of the body 21 of the ring 20, and a second floating slot 28a and a third floating slot 28b of can be defined on a second axial side 21b of the body 21 of the floating ring 20.

The first floating slot 26 of the three floating slots can have a greater depth than a depth of the second floating slot 28a and the third floating slot 28b of the three floating slots. One of ordinary skill in the art would understand that the geometry and profile of the slots can vary depending on the specific requirements of a particular application.

Figure 3C:
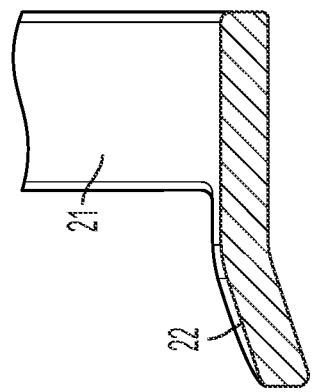
FIG. 3C is a magnified view of a portion of the ring of FIGS. 2, 3A, and 3B.
Figure 3B:
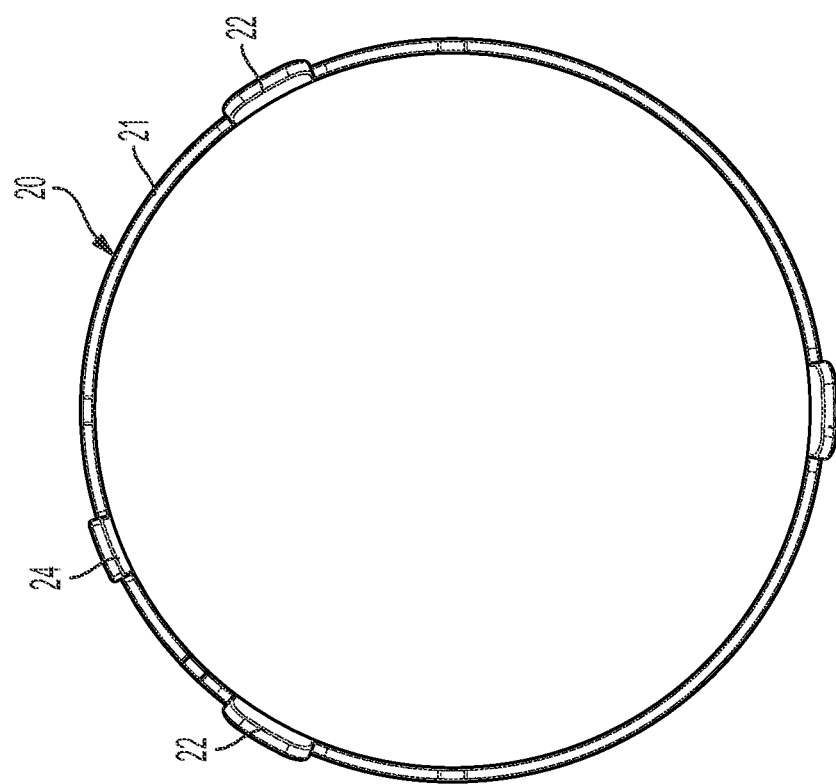
FIG. 3B is a front view of the ring of FIGS. 2 and 3A.
Figure 3A:
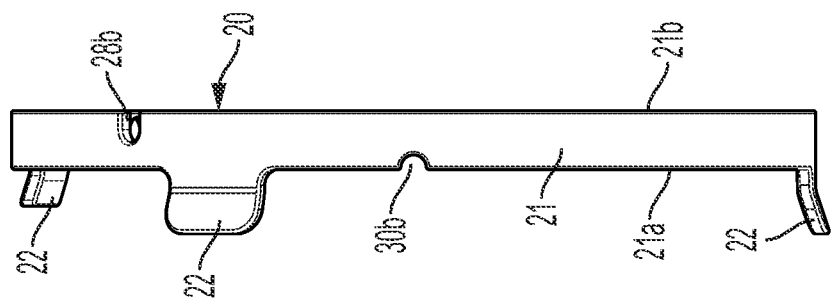
FIG. 3A is a side view of the ring of FIG. 2.

The ring 20 can include a body 21 (i.e. circular ring or body) including at least one tab 22 configured to be engaged by a user. The at least one tab 22 can include three tabs 22, in one example. One of the tabs 22 is shown in more detail in FIG. 3C. As shown in FIGS. 5A and 5B, the tabs 22 project axially outward from the housing 2 such that a user can easily engage with the tabs 22 to remove the ring 20 from the housing 2.

At least one alignment indicator 24 can be configured to align with at least one of a first indicator 14a defined on the housing 2 or a second indicator 14b defined on the housing 2 based on the relative positioning of the ring 20 and the housing 2. The first and second indicators 14a, 14b can be arranged in a circumferentially offset manner relative to each other, as shown in FIG. 1. The alignment indicator 24 can be formed as an extension, flange, tab, or other structure or marking. The indicator configuration aids a user with aligning the respective receiving areas on the ring and the openings in the housing.

A method of adjusting a configuration of a bearing housing assembly 1 is also disclosed herein. The method can include adjusting the relative mode or configuration of the bearing assembly 4 arranged within the housing 2. The method can include arranging a bearing assembly 4 inside of a housing 2, inserting a ring 20 at least partially within the housing 2 in a least one first configuration or in at least one second configuration, and securing the ring 20 relative to the housing 2 via at least one fastening element 12. The fastening element 12 can be secured such that: (i) in the first configuration, the ring 20 is arranged in a first position relative to the bearing assembly 4 and the ring 20 is configured to abut the bearing assembly 4, and (ii) in the second configuration, the ring 20 is arranged in a second position relative to the bearing assembly 4 and the ring 20 is configured to be spaced apart from the bearing assembly 4.

The at least one fastening element 12 can be inserted from a radial direction to extend through the housing 2 and the ring 20. The ring 20 can comprises a body 21 including at least one tab 22 configured to be engaged by a user. The ring 20 can include at least one alignment indicator 24 configured to align with at least one of a first indicator 14a defined on the housing 2 or a second indicator 14b defined on the housing 2 based on the relative positioning of the ring 20 and the housing 2. The ring 20 can include at least one locking receiving area 30a-30c configured to receive the at least one fastening element 12 in the first configuration, and at least one floating receiving area 26, 28a, 28b configured to receive the at least one fastening element 12 in the second configuration. Engagement of the at least one fastening element 12 by the user can be accessible from an exterior of the housing 2.

One of ordinary skill in the art would appreciate from the present disclosure that various fastening configurations could be used to secure the ring 20 relative to the housing 2 in a variety of positions.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS

Bearing Housing Assembly 1
Housing 2
Shoulder 2a of Housing
Bearing Assembly 4
Outer Bearing Ring 6
Inner Bearing Ring 8
Rolling Elements 10
Openings 11
Fastening Elements 12
First Indicator 14a
Second Indicator 14b
Ring 20
Body 21
First Axial Side 21a of Body
Second Axial Side 21b of Body
Tab 22
Alignment Indicator 24
Floating receiving area 26
Floating receiving area 28a, 28b
Locking receiving area 30a-30c

What is claimed is:

1. A bearing housing assembly comprising:
   a housing;
   a bearing assembly positioned within the housing;
   a ring configured to be secured at least partially within the housing in at least a first configuration and a second configuration, wherein:
   (i) the ring is configured to abut the bearing assembly in the first configuration such that the bearing assembly is axially fixed relative to the housing; and
   (ii) the ring is configured to be spaced apart from the bearing assembly in the second configuration such that the bearing assembly is axially displaceable within the housing; and
   at least one fastening element configured to secure the ring relative to the housing, the at least one fastening element extending radially inward through the housing and the ring.

2. The bearing housing assembly according to claim 1, wherein the ring comprises:
   at least one locking receiving area configured to receive the at least one fastening element in the first configuration; and
   at least one floating receiving area configured to receive the at least one fastening element in the second configuration.

3. The bearing housing assembly according to claim 2, wherein the at least one locking receiving area comprises three locking slots each defined on a first axial side of a body of the ring.

4. The bearing housing assembly according to claim 3, wherein the at least one floating receiving area includes three floating slots, wherein a first floating slot of the three floating slots is defined on the first axial side of the body of the ring, and a second floating slot and a third floating slot of the three floating slots are defined on a second axial side of the body of the floating ring.

5. The bearing housing assembly according to claim 4, wherein the first floating slot of the three floating slots has a greater depth than a depth of the second floating slot and the third floating slot of the three floating slots.

6. The bearing housing assembly according to claim 1, wherein the ring comprises a body including at least one tab configured to be engaged by a user, and at least one alignment indicator configured to align with at least one of: a first indicator defined on the housing, or a second indicator defined on the housing, based on the relative positioning of the ring and the housing.

7. The bearing housing assembly according to claim 1, wherein the housing comprises at least one opening configured to receive the at least one fastening element to secure the ring relative to the housing.

8. A ring configured to be secured relative to a bearing housing assembly including a housing and a bearing assembly, the ring comprising:
   a body defining a first axial side and a second axial side;
   at least one locking receiving area configured to receive at least one fastening element such that the ring is secured relative to the housing and the ring is configured to abut the bearing assembly; and
   at least one floating receiving area configured to receive at least one fastening element such that the ring is configured to be spaced apart from the bearing assembly and the bearing assembly is axially displaceable within the housing;
   wherein the at least one floating receiving area includes three floating slots, a first floating slot of the three floating slots is defined on the first axial side of the body of the ring, and a second floating slot and a third floating slot of the three floating slots are defined on a second axial side of the body of the floating ring.

9. The ring according to claim 8, wherein the at least one locking receiving area comprises three locking slots each defined on the first axial side of a body of the ring.

10. The bearing housing assembly according to claim 8, wherein the first floating slot has a different profile than a profile of the second floating slot and the third floating slot.

11. The bearing housing assembly according to claim 8, wherein the ring comprises at least one tab configured to be engaged by a user, and at least one alignment indicator configured to align with at least one of a first indicator defined on the housing or a second indicator defined on the housing based on the relative positioning of the ring and the housing.

12. A method of adjusting a configuration of a bearing housing assembly, the method comprising:
   arranging a bearing assembly inside of a housing;

inserting a ring at least partially within the housing in at least one first configuration or in at least one second configuration; and securing the ring relative to the housing via at least one fastening element, the at least one fastening element extending radially inward through the housing and the ring, and wherein the adjusting comprises changing between configurations such that:

(i) in the first configuration, the ring is arranged in a first position relative to the bearing assembly and the ring is configured to abut the bearing assembly; and (ii) in the second configuration, the ring is arranged in a second position relative to the bearing assembly and the ring is configured to be spaced apart from the bearing assembly.

13. The method according to claim 12, further comprising engaging, by a user, at least one tab of a body of the ring.

14. The method according to claim 12, further comprising aligning, via at least one alignment indicator of the ring, with at least one of a first indicator defined on the housing or a second indicator defined on the housing based on the relative positioning of the ring and the housing.

15. The method according to claim 12, further comprising:

receiving, by at least one locking receiving area, the at least one fastening element in the first configuration; and receiving, by at least one floating receiving area, the at least one fastening element in the second configuration.

16. The method according to claim 12, further comprising accessing the at least one fastening element from an exterior of the housing.

* * * * *